United States Patent [19]

Avner

[11] Patent Number: 4,510,855
[45] Date of Patent: Apr. 16, 1985

[54] SECONDARY GRILLING APPARATUS

[76] Inventor: Correy B. Avner, 241 S. Beverly Dr., Beverly Hills, Calif. 90212

[21] Appl. No.: 583,783

[22] Filed: Feb. 29, 1984

Related U.S. Application Data

[63] Continuation of Ser. No. 378,991, May 17, 1982, abandoned.

[51] Int. Cl.³ ............................................. A47J 37/06
[52] U.S. Cl. ................................. 99/450; 16/114 R; 126/25 R
[58] Field of Search ................. 99/339, 385, 444, 450; 248/16.3 R, 177, 188.8; 108/44, 46; 16/114 A, 114 R; 126/25 R

[56] References Cited

U.S. PATENT DOCUMENTS

| | | | |
|---|---|---|---|
| 95,909 | 10/1869 | Johnson et al. | |
| 213,532 | 3/1879 | Selleck | |
| 252,143 | 1/1882 | Ross | 16/114 A |
| 265,608 | 10/1882 | Johnston | |
| 1,017,561 | 2/1912 | Klossner | 16/114 A |
| 2,067,661 | 1/1937 | Ferrelle | 108/46 |
| 2,216,457 | 10/1940 | Salisbury | 99/450 X |
| 2,872,557 | 1/1957 | Thrasher | |
| 2,920,614 | 6/1957 | Phelps | |
| 3,182,585 | 8/1962 | Rensch et al. | |
| 3,416,510 | 6/1966 | Paulson | |
| 3,552,302 | 1/1971 | Gilberg | 99/450 X |
| 3,583,385 | 6/1971 | Beller | |
| 3,651,796 | 3/1972 | Nelson | 99/450 X |
| 3,692,012 | 9/1972 | Wiggins | |
| 3,717,083 | 2/1973 | Karapetian | |
| 3,937,138 | 2/1976 | Tidwell | 99/450 |
| 4,428,281 | 1/1984 | Miller | 99/450 X |

FOREIGN PATENT DOCUMENTS

| | | | |
|---|---|---|---|
| 46940 | 2/1933 | Denmark | 99/450 |
| 707142 | 5/1941 | Fed. Rep. of Germany | 99/450 |
| 934077 | 9/1955 | Fed. Rep. of Germany | 99/339 |
| 3927 | of 1890 | United Kingdom | 99/450 |
| 13545 | of 1914 | United Kingdom | 99/449 |

Primary Examiner—Billy J. Wilhite
Attorney, Agent, or Firm—Daniel J. Meaney, Jr.

[57] ABSTRACT pg,1 A secondary grilling apparatus comprises a plurality of interconnected surface members forming apertures therebetween. The surface members are substantially wider than the elements comprising conventional grills and the apertures are substantially narrower than the spaces generally provided between the elements in conventional grills. Adjustable depending prong means for supporting the secondary grill in spaced relation to the conventional primary grill is provided. The secondary grill may furthermore include a removable handle.

5 Claims, 5 Drawing Figures

SECONDARY GRILLING APPARATUS

This application is a continuation of application Ser. No. 378,991, filed May 17, 1982, now abandoned.

BACKGROUND OF THE INVENTION

1. Field of the Invention

This invention relates to a grilling apparatus, more particularly, to a secondary grilling apparatus for use with a standard outdoor grill. The secondary grilling apparatus makes it possible to cook delicate foodstuffs on an outdoor grill without loss of substantial amounts of the foodstuff through the apertures in the standard outdoor grill.

2. Prior Art

The outdoor grill is a familiar object in contemporary life. Almost invariably, outdoor grills include a vessel in which a substance is burned to produce heat. Above the vessel is placed a grill which is conventionally constructed of a number of parallel elements connected to a peripheral or intermediate frame to form a primary grill having spaced elements on which food to be cooked may be placed. In general, such primary grills are comprised of relatively thin columnar stock material, the pieces of stock material being arranged with respect to one another in a parallel fashion. Conventionally, the spaces between the stock material elements is much greater than the diameter of the piece of stock material itself.

Such conventional grills are perfectly adequate for the cooking of foodstuffs which are relatively large in size and which tend to cook in a coherent mass. Conventional grills of this type are suitable for cooking pieces of meat which are held together by connective tissue or bone, such as steaks or chops from any species of animal, disarticulated pieces of fowl such as chicken and duck or foodstuff held together by binders such as hot dogs.

Conventional grills are, however, inadequate for cooking foodstuffs which tend not to remain in a coherent mass during the cooking process. For example, the flesh of fish tends to flake when cooked, and when cooked on a conventional grill, the flesh of the fish is inadequately supported and tends to fall through the apertures between the grill elements and into the vessel containing the heat generating substance.

One approach to cooking flakey foodstuff on conventional grills is to support the foodstuff either in a vessel such as a frying pan or to enclose it in a wrapping of metal foil. However, these methods present a physical barrier to the heat and aromatic elements which give char-broiled foods their distinctive flavor and appeal.

The instant invention allows such flakey foodstuffs to be char-broiled by providing a secondary grilling surface which adequately supports flakey foods, such as fish, during char-broiling. Although secondary grilling surfaces are known in the prior art, none has the distinctive features of the instant invention.

Thus, U.S. Pat. No. 2,920,614 illustrates a grilling device intended to be located on the top of a standard primary grill. However, the surface of this device is not designed to support foodstuffs which flake during cooking.

U.S. Pat. No. 3,717,083 also shows a secondary grill which fits over a primary grill and is self-supporting thereon, but the intersecting members of the secondary grill have lengthwise undulations and furthermore have no special adaptation for the cooking of foodstuffs which flake.

U.S. Pat. Nos. 3,416,510 and 2,872,557 have devices which when placed on the tops of stoves provide for cooking and heating of foodstuffs, but beyond the fact that they are used in conjunction with the surface of a stove, they bear no resemblance to the invention which is claimed hereinbelow.

U.S. Pat. Nos. 3,583,385; 213,532; and 265,608 all have grilling surfaces in which the elements comprising the grill appear to have widths greater than that employed in conventional charcoal grills.

U.S. Pat. No. 95,909 discloses a broiler having two grids held in spaced relation to one another and supported from above.

A grill disclosed in U.S. Pat. No. 3,182,585 has no special adaptation for delicate foods, although the rack rests on an adjustable mechanism.

The grill disclosed in U.S. Pat. No. 3,692,012 has dual grilling surfaces, but neither one is modified for cooling delicate foodstuffs.

OBJECTS OF THE INVENTION

One object of the invention is to provide a grill apparatus suitable for use with foodstuffs which tend to flake upon cooking.

Another object of the invention is to provide a grill apparatus which can be used with a conventional grill surface without any alteration of the primary grill.

A further object of the invention is to provide a secondary grill surface suitable for cooking foodstuffs tending to flake and which does not interfere with the interaction between the foodstuff and the aromatic substances contained in the cooking gases of a charcoal broiler.

Yet another object of the invention is to provide a secondary grilling apparatus having support means which can be adjusted to rest on the spaced elements of a variety of configurations of primary grills.

A yet further object of the invention is to provide a secondary grill which may be conveniently placed on or off of a hot primary grill by means of handles.

SUMMARY OF THE INVENTION

The instant invention allows foodstuffs which tend to flake upon cooking to be char-broiled in conjunction with a conventional or primary grill surface. In the present invention, a secondary grilling apparatus is provided. This apparatus comprises a plurality of interconnected members. These interconnected members define apertures therebetween. The interconnected members have upper and lower surfaces. In general, the upper surface of the interconnected members is substantially planar.

At least one means for supporting the interconnected members is attached to the lower surface thereof. This supporting means supports the interconnected members in spaced relation from the surface of a plurality of spaced elements which form the primary grill surface. In general, the width of the interconnected members is greater than the width of the plurality of spaced elements which form the primary grill. Furthermore, the apertures, defined between the interconnected members is generally narrower than the apertures formed between spaced elements of the primary grill.

Handle means, which may be removable, are also provided for lifting the secondary grilling apparatus onto and off of the primary grill.

BRIEF DESCRIPTION OF THE DRAWING

These and other objects of the invention will be better appreciated from the following description with reference to the accompanying drawings wherein.

DETAILED DESCRIPTION

Figure 1:
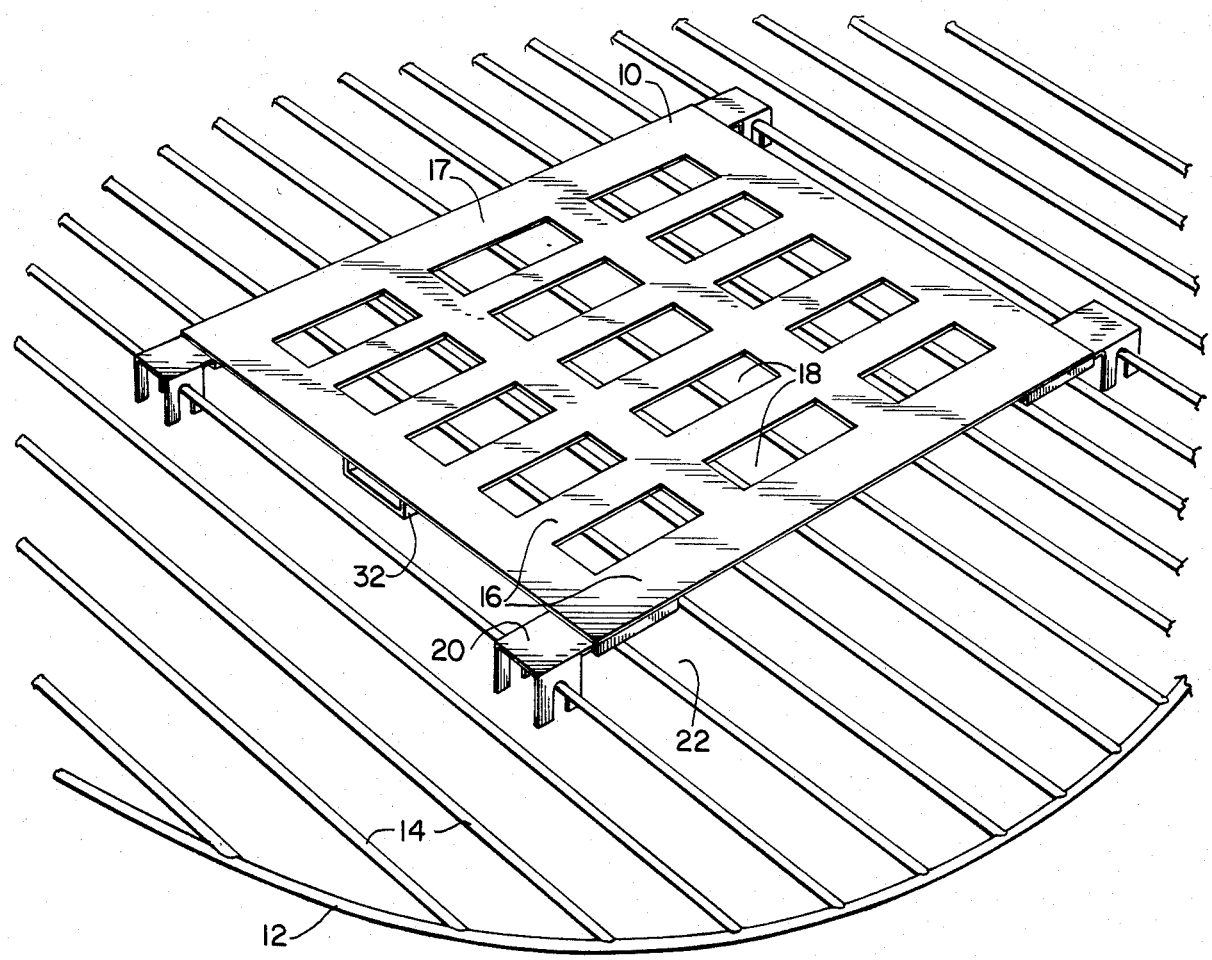
FIG. 1 is a perspective view of the secondary grilling apparatus resting on a primary grill.
Figure 2:
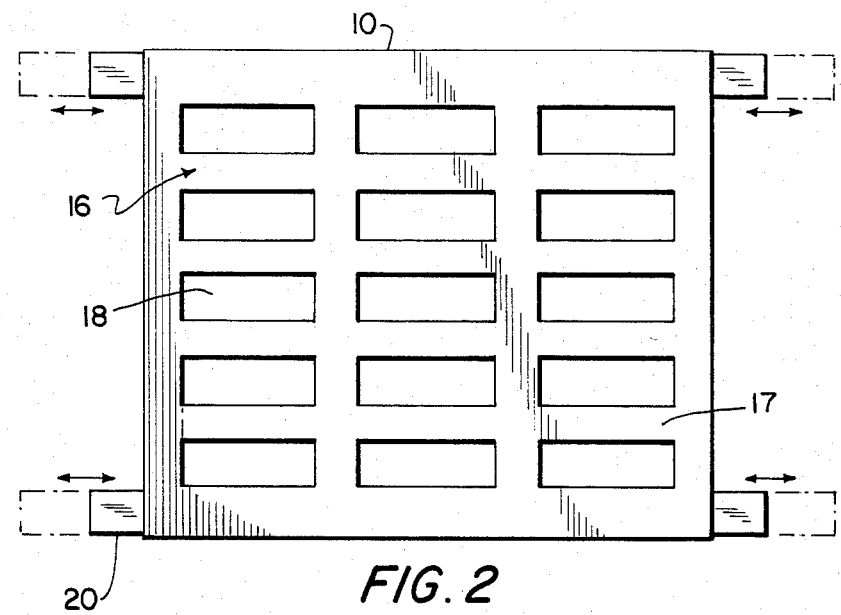
FIG. 2 is a top plan view of the secondary grilling apparatus.
Figure 3:
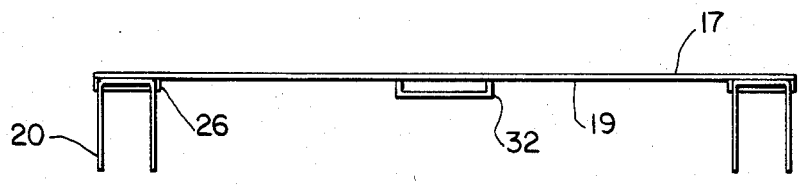
FIG. 3 is a front view of the secondary grilling apparatus.
Figure 4:
FIG. 4 is a side view of the secondary grilling apparatus.
Figure 5:
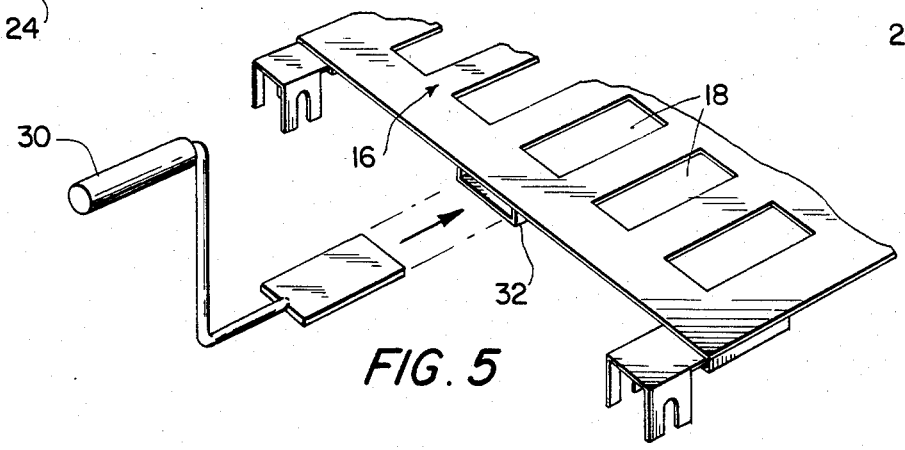
FIG. 5 is a perspective view of the grilling apparatus and handles used therewith.

A secondary grilling apparatus 10 can, in some situations be used alone, or more usually, in conjunction with a primary grill 12 having a plurality of primary grill elements 14. The secondary grilling apparatus comprises a plurality of interconnected members 16 which define openings 18 therebetween. The interconnected members 16 have an upper surface 17 and a lower surface 19. In general, the upper surface is relatively flat, although a slight curvature of the upper surface 17 does not interfere with the function of the secondary grilling apparatus 10. The secondary grilling apparatus 10 has a plurality of supporting means 20 for supporting the interconnected members. The supporting means 20 may be, for example, a prong 22 attached to the secondary grill apparatus, preferably on the lower surface 19 thereof.

The position of the prongs may be adjusted so that the prong 22 engages the elements 14 of the primary grill 12, thus allowing the secondary grilling apparatus 10 to be positioned in spaced relation to the surface of the primary grill. In the preferred embodiment, the width of the apertures 18 between the interconnected members 16 is substantially narrower than the width of the spaces 22 between the elements 14 of the primary grill 12. In addition, in a further preferred embodiment, the width of the interconnected members 16 is substantially wider than that of the elements 14 comprising the primary grill.

By means of the adjustable support means 20 the secondary grill apparatus can be used in conjunction with a variety of configurations of primary grill surfaces. The support means 20 or prong 22 can be brought into register with the elements 14 making up the primary grill by a support member adjusting means 24 which in a preferred embodiment includes a plurality of open-ended brackets 26 attached to the lower surface 19 and an extension 28, either integral with or attached to the prong 22. The extension 22 is movable within the open-ended brackets 26 and may be adjusted to accomodate a variety of prongs 22 between element 14 of the primary grill 12.

The secondary grilling apparatus 10 in a preferred embodiment may be placed on or removed from a hot primary grill 12 by means of a handle 30. A portion of the handle 30 may be inserted into open-ended brackets 32 attached to the lower surface 19 of the secondary grill.

As described, the secondary grill apparatus can be used for cooking a number of foodstuffs without cooking vessels or foil enclosures. In particular, the secondary grill apparatus is extremely useful for char-broiling fish, either whole or fileted.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinabove set forth and falling within the scope of the invention or the limits of the appended claims.

I claim:

1. A secondary grilling apparatus for use with a primary grill formed by a plurality of spaced elements, comprising:

(a) a plurality of interconnected surface having upper and lower surfaces, said surface members defining apertures therebetween wherein the apertures on each surface member define a plurality of spaced, aligned apertures formed into a predetermined pattern with the area of the surface member between apertures being approximately equal to the area thereof having apertures, the width of said apertures being substantially smaller than the space between spaced elements forming the primary grill and sufficiently narrow to permit foodstuffs having a flaked structure when cooked to be cooked on the secondary grilling apparatus without falling through the apertures;

(b) means for supporting said interconnected surface members, said supporting means being movably adjustable relative to said surface members and having a selected fixed height whereby said supporting means maintain said surface members in a selected spaced relation from the surface of the primary grill;

(c) means on said supporting means being in the form of depending prong-shaped means for engaging and resting on and receiving the elements of the primary grill therein; and (d) a handle removably connected to the secondary grilling apparatus, including an open-ended bracket on said surface members for receiving a portion of said handle therein.

2. The grilling apparatus defined in claim 1, wherein said upper surface is substantially planar.

3. The secondary grilling apparatus defined in claim 1, further comprising an elongated supporting means operatively coupled to said supporting means for longitudinally adjusting the position of said supporting means.

4. The secondary grilling apparatus defined in claim 1, wherein said prong-shaped means includes open-ended brackets which are attached to said lower surface of said surface members.

5. A secondary grilling apparatus adapted for use with a primary grill having a surface formed by a plurality of spaced elements comprising:

means defining a substantially planar surface member having an upper surface and lower surface, said means defining said surface member including means defining apertures which extend between the upper surface and the lower surface wherein the apertures on each surface member define a plurality of spaced, aligned apertures formed into a predetermined pattern and wherein the apertures' open area defined by the means defining the surface member is approximately equal to the remaining area of the means defining said surface member, the width of said apertures being substantially smaller than the spaces between the spaced elements forming the primary grill with said apertures being unobstructed to directly receive heat passing through the primary grill, said upper surface being adapted to receive and support foodstuffs which become flaky during cooking enabling the remaining area of the means defining the surface member to support cooked foodstuffs and prevent the same from falling through the open area defined by the apertures;

means for supporting said means defining said surface member, said supporting means being movably adjustable relative to said means defining said surface member and having a selected fixed height, whereby said supporting means maintains said lower surface of said means defining a surface member in selected spaced relation from the surface of the primary grill; and fixed means on said supporting means adapted for releasably engaging the spaced elements of the primary grill to maintain said lower surface in said selected spaced relation from the surface of the primary grill.

* * * * *